(12) United States Patent (10) Patent No.: US 7,592,900 B2
Kamen et al. (45) Date of Patent: Sep. 22, 2009

(54) TRANSPORTER MOTOR ALARM (75) Inventors: Dean Kamen, Bedford, NH (US); Burl Amsbury, Boulder, CO (US); Richard W. Arling, Windham, NH (US); J. Douglas Field, Bedford, NH (US); Jeffrey Finkelstein, Shelbourne, VT (US); John David Heinzmann, Manchester, NH (US); Christopher Langenfeld, Nashua, NH (US); Philip LeMay, Bedford, NH (US); John B. Morrell, Bedford, NH (US); Jason M. Sachs, Goffstown, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 140 days.

(21) Appl. No.: 11/552,829

(22) Filed: Oct. 25, 2006

(65) Prior Publication Data

US 2007/0252683 A1 Nov. 1, 2007

Related U.S. Application Data (62) Division of application No. 10/308,888, filed on Dec. 3, 2002, now abandoned.

(60) Provisional application No. 60/388,937, filed on Jun. 14, 2002, provisional application No. 60/347,800, filed on Jan. 10, 2002, provisional application No. 60/336,601, filed on Dec. 5, 2001.

(51) Int. Cl.
*G08B 3/10* (2006.01)

(52) U.S. Cl. .............. 340/384.7; 340/427; 340/428; 340/429; 340/441; 340/425.5; 180/6.28; 180/60; 180/65.1

(58) Field of Classification Search ............ 340/384.7, 340/425.5, 427, 428, 435, 460, 467, 429, 340/436, 441; 180/274, 279, 285, 6.28, 7.1, 180/8.1, 21, 60, 65.1, 171, 179, 204, 218, 180/271, 281, 907; 342/72; 701/45, 48; 367/139, 21, 25, 35, 38, 83, 88, 89, 140, 367/144; 324/546; 318/1, 5, 53, 58, 114, 318/119, 121, 126, 139; 280/11, 47.18, 47.131; 323/214, 222, 273, 282
See application file for complete search history.

(56) References Cited

U.S. PATENT DOCUMENTS

| 5,191,618 A | * | 3/1993 | Hisey ................. 381/165 |
| 5,594,411 A | * | 1/1997 | Ono .................. 340/425.5 |
| 6,229,234 B1 | * | 5/2001 | Lambert et al. ........... 310/81 |
| 6,555,979 B2 | * | 4/2003 | Arnold et al. ........... 318/272 |
| 6,753,663 B2 | * | 6/2004 | Jung et al. ............... 318/3 |
| 2006/0231313 A1 | * | 10/2006 | Ishii .................. 180/218 |

FOREIGN PATENT DOCUMENTS

KR 2003077787 * 10/2003

* cited by examiner

*Primary Examiner*—Benjamin C Lee
*Assistant Examiner*—Sisay Yacob
(74) *Attorney, Agent, or Firm*—McCormick, Paulding & Huber LLP (57) ABSTRACT An audio alarm for a transporter having an electric motor. The alarm has a signal generator for generating a signal within the audible frequency range and a modulator for modulating a current that is applied to the electric motor in accordance with the signal generated by the signal generator.

4 Claims, 6 Drawing Sheets

TRANSPORTER MOTOR ALARM

FIELD OF THE INVENTION

The present application is a divisional application of U.S. patent application Ser. No. 10/308,888, filed Dec. 3, 2002 now abandoned. The present application claims priority from U.S. patent application Ser. No. 09/687,789, filed Oct. 13, 2000, as well as from U.S. Provisional Patent Application 60/336,601, filed Dec. 5, 2001, U.S. Provisional Patent Application 60/388,937, filed Jun. 14, 2002, and U.S. Provisional Patent Application 60/347,800, filed Jan. 10, 2002, each of which applications is incorporated herein by reference.

FIELD OF THE INVENTION

The present application is directed to customized modes of control and security features for a personal transporter.

BACKGROUND OF THE INVENTION

A computer on board a transporter may be programmed to associate specified performance and ride characteristics with one or more particular drivers, as described, for example, in U.S. Pat. No. 6,198,996 B1 ("Berstis"), incorporated herein by reference.

Certain transporters, however, raise particular problems with respect to tailoring a control system to the personal characteristics of an individual. Such transporters include, for example, dynamically stabilized transporters, in which a control system actively maintains the stability of the transporter while it is in operation. In a dynamically stabilized transporter, as described, for example, in U.S. Pat. No. 6,302,230 ("Kamen"), incorporated herein by reference, a control system typically maintains the stability of the transporter by sensing such parameters as tilt and tilt rate and by commanding wheel actuators to apply torque to the wheels. These are examples of parameters used by a stabilizer subsystem to maintain stability of the transporter.

Data concerning the personal characteristics of a user may be particularly significant in tailoring the control system for a dynamically-stabilized transporter. It is thus desirable to address features peculiar to the control of a dynamically-stabilized transporter and, more generally, to vehicles having specialized safety and security requirements.

SUMMARY OF THE INVENTION

In accordance with preferred embodiments of the present invention, an audio alarm is provided for a transporter having an electric motor. The alarm has a signal generator for generating a signal within the audible frequency range and a modulator for modulating a current that is applied to the electric motor in accordance with the signal generated by the signal.

Sensors aboard the transporter may be used, in accordance with further embodiments of the invention, to detect unauthorized contact with the transporter. In response to sensed unauthorized contact, as well as to specified environmental characteristics, the transporter may be disabled or caused to operate in an extraordinary mode in such a manner as to limit its functionality in specified ways.

BRIEF DESCRIPTION OF THE DRAWINGS

The invention will be more readily understood by reference to the following description, taken with the accompanying drawings, in which.

DESCRIPTION OF PREFERRED EMBODIMENTS

Figure 1:
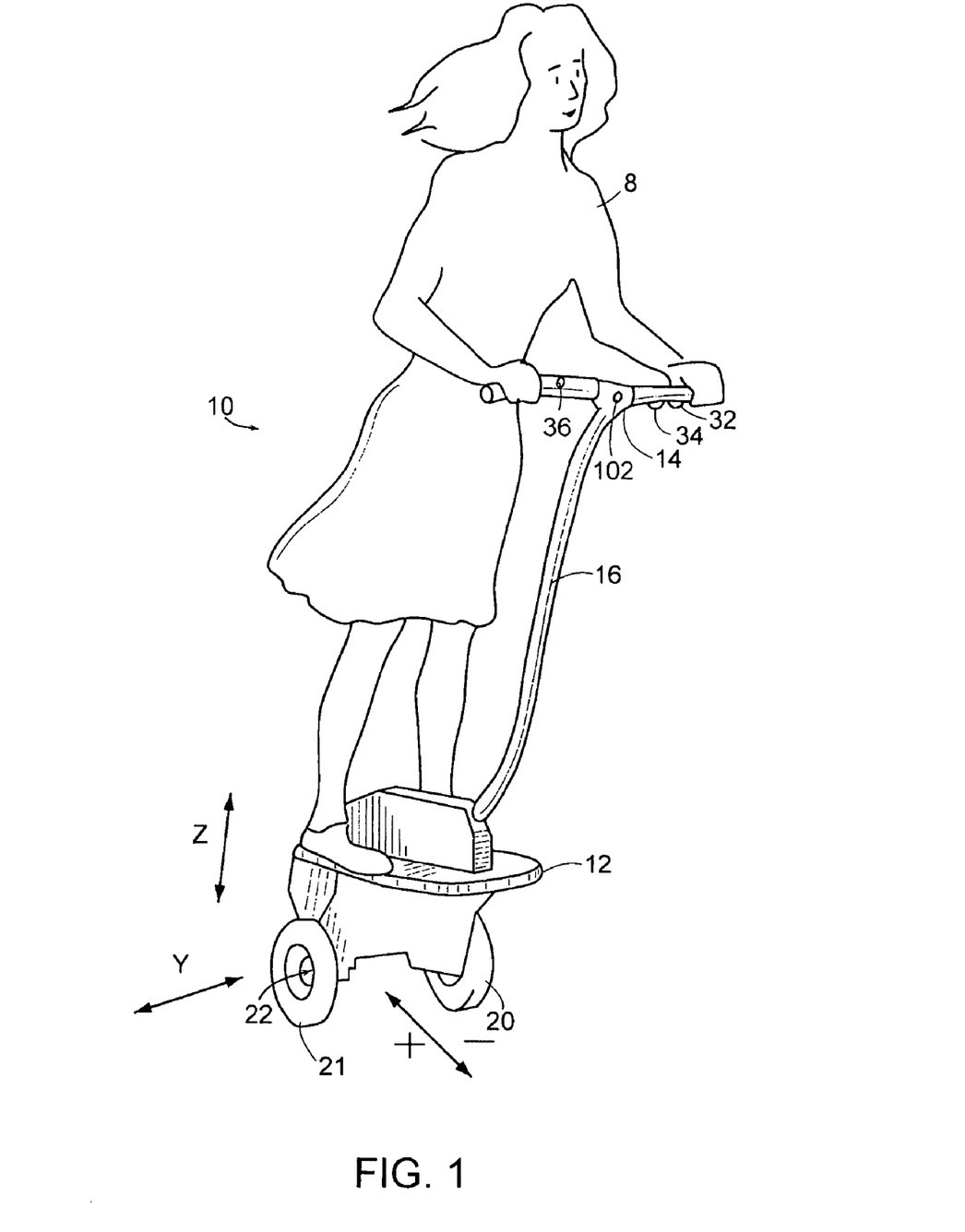
FIG. 1 shows a personal transporter, as described in detail in U.S. Pat. No. 6,302,230, to which the present invention may advantageously be applied.

FIG. 1 shows a personal transporter, designated generally by numeral 10, and described in detail in U.S. Pat. No. 6,302,230, as an example of a device to which the present invention may advantageously be applied. A subject 8 stands on a support platform 12 and holds a grip 14 on a handle 16 attached to the platform 12. A control loop may be provided so that leaning of the subject results in the application of torque to wheel 20 about axle 22 by means of a motor drive 72 depicted schematically in FIG. 2, as discussed below, thereby causing an acceleration of the transporter. Transporter 10, however, is statically unstable, and, absent operation of the control loop to maintain dynamic stability, transporter 10 will no longer be able to operate in its typical operating orientation. "Stability" as used in this description and in any appended claims refers to the mechanical condition of an operating position with respect to which the system will naturally return if the system is perturbed away from the operating position in any respect.

Different numbers of wheels or other ground-contacting members may advantageously be used in various embodiments of the invention as particularly suited to varying applications. Thus, within the scope of the present invention, the number of ground-contacting members may be any number equal to, or greater than, one. A personal transporter may be said to act as 'balancing' if it is capable of operation on one or more wheels (or other ground-contacting elements) but would be unable to stand stably on the wheels but for operation of a control loop governing operation of the wheels. The wheels, or other ground-contacting elements, that provide contact between such a personal transporter and the ground or other underlying surface, and minimally support the transporter with respect to tipping during routine operation, may be referred to herein as 'primary ground-contacting elements.' A transporter such as transporter 10 may advantageously be used as a mobile work platform or a recreational vehicle such as a golf cart, or as a delivery vehicle.

In order to personalize operation of a transporter, in accordance with preferred embodiments of the present invention, data are provided for allowing the control system of the transporter to associate a particular user with data specific to that user. Means for uniquely identifying a user include a token typically in the possession of a specified user, or information solicited by the controller and uniquely provided by the specified user.

Transporter 10 may be operated in a station-keeping mode, wherein balance is maintained substantially at a specified position. Additionally, transporter 10, which may be referred to herein, without limitation, as a "vehicle," may also maintain a fixed position and orientation when the user 8 is not on platform 12. This mode of operation, referred to as a "kickstand" mode, prevents runaway of the transporter, provides for the safety of the user and other persons, and allows convenient, rapid mounting and dismounting of the transporter. A forceplate or other sensor, disposed on platform 12, detects the presence of a user on the transporter, as discussed in detail below with reference to FIG. 3.

In an alternate operational mode, if a user is not detected on the transporter, the transporter will decelerate to a stop and continue to operate in "kickstand mode." This allows for the continued stability of the device in the event that variations in surface slope, terrain characteristics, or transporter loading cause the transporter controller to fail to detect the presence of a user.

Other embodiments of a balancing transporter in accordance with the present invention may have clusters, with each cluster having a plurality of wheels. Supplemental ground-contacting members may be used in stair climbing and descending or in traversing other obstacles.

Figure 2:
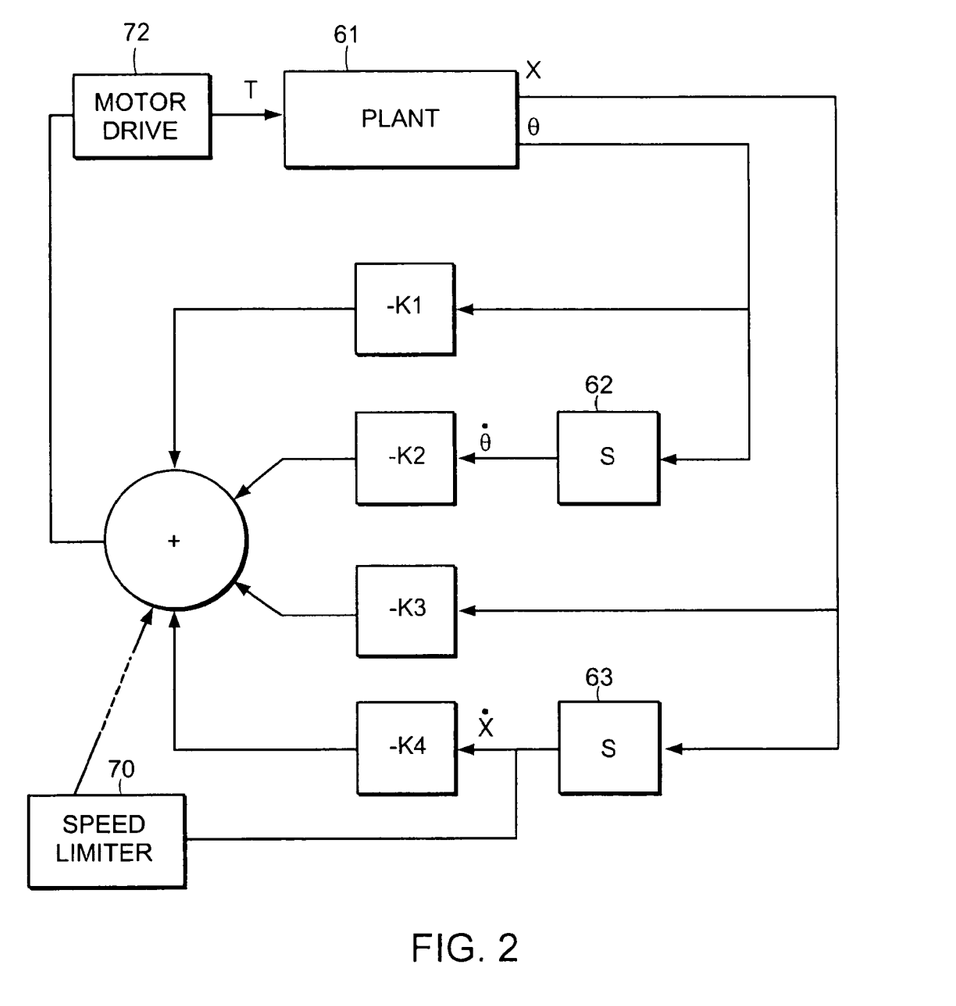
FIG. 2 illustrates the control strategy for a simplified version of FIG. 1 to achieve balance using wheel torque.

A simplified control algorithm for achieving balance in the embodiment of the invention according to FIG. 1 when the wheels are active for locomotion is shown in the block diagram of FIG. 2. The plant 61 is equivalent to the equations of motion of a system with a ground contacting module driven by a single motor, before the control loop is applied. T identifies the wheel torque. The remaining portion of the figure is the control used to achieve balance. Boxes 62 and 63 indicate differentiation. To achieve dynamic control to insure stability of the system, and to keep the system in the neighborhood of a reference point on the surface, the wheel torque T in this embodiment is governed by the following simplified control equation:

$$\text{Error! Objects cannot be created from editing field codes.}, \quad (1)$$

where:

T denotes a torque applied to a ground-contacting element about its axis of rotation;

$\theta$ is a quantity corresponding to the lean of the entire system about the ground contact, with $\theta_0$ representing the magnitude of a system pitch offset, all as discussed in detail below;

x identifies the fore-aft displacement along the surface relative to a fiducial reference point, with $x_0$ representing the magnitude of a specified fiducial reference offset;

a dot over a character denotes a variable differentiated with respect to time; and a subscripted variable denotes a specified offset that may be input into the system as described below; and $K_1$, $K_2$, $K_3$, and $K_4$ are gain coefficients that may be configured, either in design of the system or in real-time, on the basis of a current operating mode and operating conditions as well as preferences of a user. The gain coefficients may be of a positive, negative, or zero magnitude, affecting thereby the mode of operation of the transporter, as discussed below. The gains $K_1$, $K_2$, $K_3$, and $K_4$ are dependent upon the physical parameters of the system and other effects such as gravity. The simplified control algorithm of FIG. 2 maintains balance and also proximity to the reference point on the surface in the presence of disturbances such as changes to the system's center of mass with respect to the reference point on the surface due to body motion of the subject or contact with other persons or objects. It should be noted that the amplifier control may be configured to control motor current (in which case torque T is commanded, as shown in FIG. 2) or, alternatively, the voltage applied to the motor may be controlled, which has the effect of increasing $K_4$ in the dynamic equation due to back-emf of the motor, but does not fundamentally alter the form of the equation.

The effect of $\theta_0$ in the above control equation (Eqn. 1) is to produce a specified offset $\theta_0$ from the non-pitched position where $\theta=0$. Adjustment of $\theta_0$ will adjust the transporter's offset from a non-pitched position. As discussed in further detail below, in various embodiments, pitch offset may be adjusted by the user, for example, by means of a thumb wheel 32, shown in FIG. 1. An adjustable pitch offset is useful under a variety of circumstances. The primary benefit of a pitch offset adjustment is to allow for a desired nominal body orientation on the transporter. While not typically so employed, it is also possible for the operator to stand erect with respect to gravity even on an incline, when the transporter is stationary or moving at a uniform rate. On an upward incline, a forward torque on the wheels is required in order to keep the wheels in place. This requires that the user push the handle further forward, requiring that the user assume an awkward position. Conversely, on a downward incline, the handle must be drawn back in order to remain stationary. Under these circumstances, $\theta_0$ may advantageously be manually offset to allow control with respect to a stationary pitch comfortable to the user.

Alternatively, $\theta_0$ can be modified by the control system of the transporter as a method of limiting the speed and/or the performance of the transporter.

The magnitude of $K_3$ determines the extent to which the transporter will seek to return to a given location. With a non-zero $K_3$, the effect of $x_0$ is to produce a specified offset $-x_0$ from the fiducial reference by which x is measured. When $K_3$ is zero, the transporter has no bias to return to a given location. The consequence of this is that if the transporter is caused to lean in a forward direction, the transporter will move in a forward direction, thereby maintaining balance.

The term "lean" may be used with respect to a system balanced on a single point or line of a contact between a perfectly rigid body and a surface. In that case, the point (or line) of contact between the body and the underlying surface has zero theoretical width. In that case, furthermore, lean may refer to a quantity that expresses the orientation with respect to the vertical (i.e., an imaginary line passing through the center of the earth) of a line from the center of gravity (CG) of the system through the theoretical line of ground contact of the wheel. While recognizing, as discussed above, that an actual ground-contacting member is not perfectly rigid, the term "lean" is used herein in the common sense of a theoretical limit of a rigid ground-contacting member. The term "system" refers to all mass caused to move due to motion of the ground-contacting elements with respect to the surface over which the transporter is moving.

In order to accommodate two wheels instead of the one-wheel system illustrated for simplicity in FIG. 2, separate motors may be provided for left and right wheels of the transporter and the torque desired from the left motor and the torque desired from the right motor can be calculated separately in the general manner described in U.S. Pat. No. 6,288, 505, issued Sep. 11, 2001. Additionally, tracking both the left wheel motion and the right wheel motion permits adjustments to be made to prevent unwanted turning of the transporter and to account for performance variations between the two drive motors.

It can be seen that the approach of adjusting motor torques when in the balance mode permits fore-aft stability to be achieved without the necessity of additional stabilizing wheels or struts (although such aids to stability may also be provided). In other words, stability is achieved dynamically, by motion of the components of the transporter (in this case constituting the entire transporter) relative to the ground.

Non Dynamically-Stabilized Operation

When the transporter is not being operated in a dynamically-stabilized mode, it can be operated in alternative modes. For example, the transporter can be operated such that the yaw (steering) control, such as thumb wheels 32, 34 (shown in FIG. 1) mounted on handle 16 as discussed above, can be used to control the fore and aft movement of the transporter. Other controls typically employed for yaw control, such as a rotary yaw grip, for example, when used to control fore/aft motion of the transporter are within the scope of the present invention.

In the mode referred to as 'follow mode', for example, turning the yaw control in the direction which would turn the transporter to the right during dynamically stabilized operation can be used to move the transporter forward. By extension, turning the yaw control as would turn the transporter to the left during dynamically stabilized operation can be used to move the transporter backwards.

Figure 4:
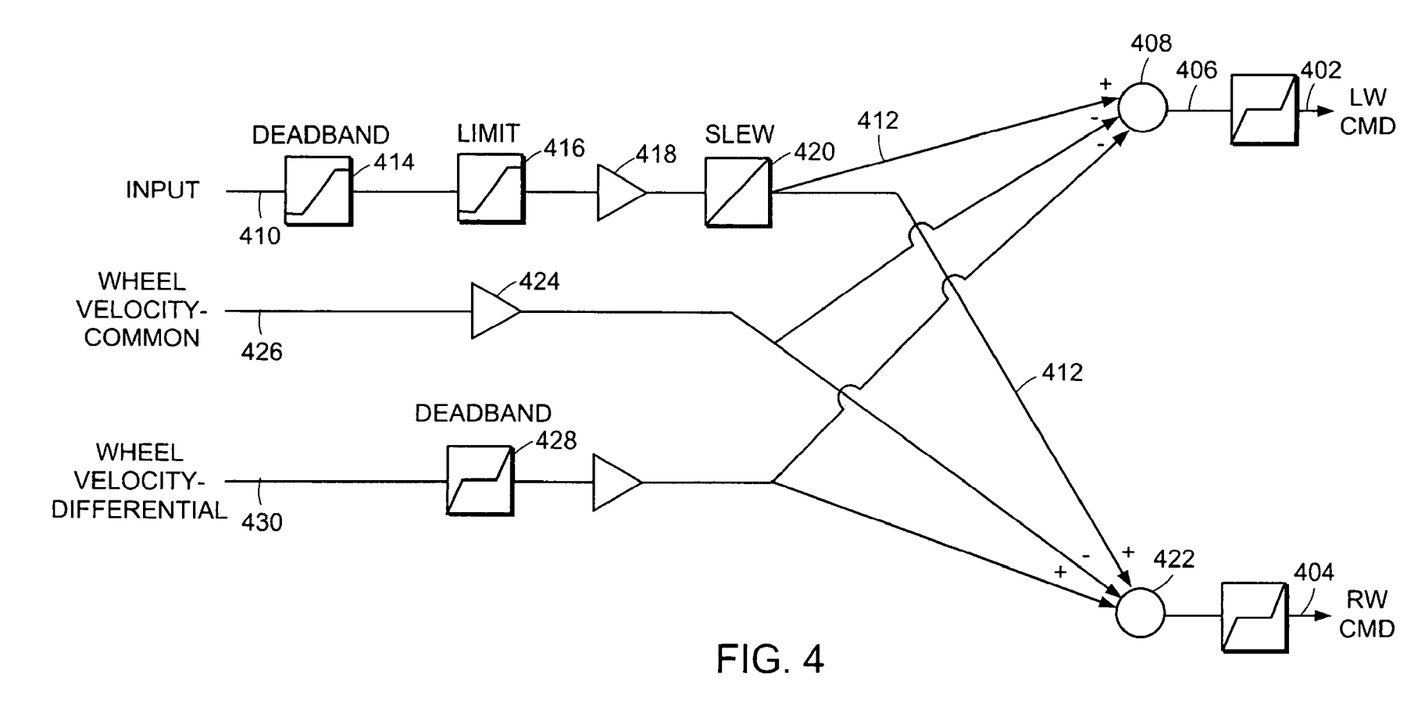
FIG. 4 is block diagram of a follow-mode controller in accordance with embodiments of the present invention.

Referring now to FIG. 4, a schematic is shown of the control mode, referred to as 'follow mode,' wherein a user may guide operation of a two-wheeled transporter while walking alongside or behind the transporter rather than being supported by it as in ordinary operation of the transporter.

FIG. 4 depicts the manner in which command signals are derived for each of the wheel motor amplifiers, the left wheel command 402 and the right wheel command 404. Application of motor commands to govern wheel actuators to drive wheels 20 and 21 is described in U.S. Pat. No. 6,288,505. Each wheel command is the result of a signal 406 described here in regard to the left wheel for purposes of illustration. Multiple terms contribute to signal 406 and they are added at summer 408, with the signs of the respective terms as now described.

It is to be understood that various modes of motor control are within the scope of the invention. For example, the motors may be commanded in current mode, wherein the torque applied to the wheels is commanded and, as shown below, ultimate subject to user input. Thus, the user governs how much torque is applied. This is a mode of operation that users tend to be comfortable with, allowing a user to urge the transporter over an obstacle or up a curb or a stair. On the other hand, the wheel motors may be governed in voltage mode, where wheel velocity is controlled by the user input.

User input 410 is received from a user input device that may be thumbwheel 32 (shown in FIG. 1) or may be another user input device. User input 410 leads to generation of a control signal 412. User input is typically conditioned in one or more manners to generate control signal 412. For example, a deadband 414 may be provided such that the range of no response is extended about zero. As another example, the range of control signal in response to user input may be limited by a limiter 416. Any manner of tailoring of the response of the control signal to user input is within the scope of the present invention. A gain is provided by amplifier 418, where the gain may be constant or dependent upon various parameters. Finally, the slew rate of change of commanded control signal may be limited by slew limiter 420.

In addition to control signal 412 which is applied, via summers 408 and 422 to the respective wheel amplifiers, a counteracting contribution to wheel torque is provided that is proportional, modulo gain 424, to the common component 426 of the rotational velocity of the respective right and left wheels. Since the counteracting component is proportional to velocity, it acts as an artificially imposed friction and the user feels a resistance to pushing (or pulling) the transporter.

Finally, a differential term, proportional, above a threshold set by deadband 428, to the differential rotational velocity 430 of the two wheels. This allows the preceding velocity-based term to be overcome in the case where the user seeks to turn the transporter in place.

The non-dynamically stabilized 'follow' mode can be used to transport the transporter up a flight of stairs or to transport the transporter, with or without an additional payload, without the need to place the transporter in a dynamically stabilized mode.

Rider Detection

Figure 3:
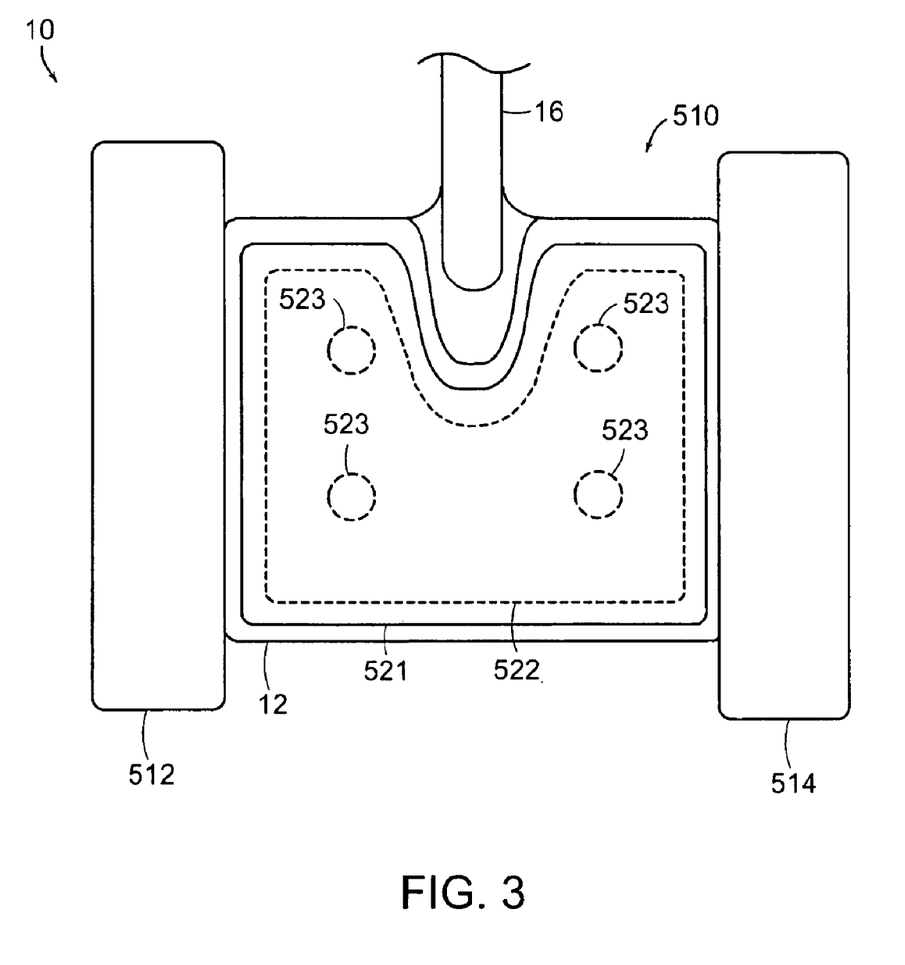
FIG. 3 is a top view of a platform for supporting a user of the transporter of FIG. 1, showing a rider detector.

FIG. 3 shows a rider detection mechanism used in an embodiment of the present invention, as described in detail in U.S. Pat. No. 6,288,505. When the absence of a rider is detected, the transporter is allowed to operate in one or more riderless modes. FIG. 3 shows a top view of the rider detector designated generally by numeral 510. Transporter 10 incorporating the rider detector includes a base 12, left wheel fender 512, right wheel fender 514, support stem 16 for handlebar 14 (shown in FIG. 1). Wheel fenders 512 and 514 cover the corresponding wheels. Support stem 16 is attached to the base 12 and provides a sealed conduit for transmission of signals from controls 32, 34 (shown in FIG. 1) that may be located on the handlebar to the control electronics sealed in the base 12. Wheel fenders 512, 514 are rigidly attached to the sides of the base.

The top of base 12 provides a substantially flat surface and is sized to comfortably support a rider standing on the base 12. A mat 521 covers the top of the base 12 and provides additional protection to the base 12 from particles and dust from the environment. In an alternate embodiment, the mat may also cover part of the fenders 512 514 and may be used to cover a charger port (not shown) that provides for external charging of the power supply. Mat 521 may be made of an elastomeric material that provides sufficient traction such that the rider does not slip off the mat 521 under expected operating conditions. A plate 522 is positioned between base 12 and mat 521. Plate 522 is made of a rigid material and evenly distributes the force acting on the plate 522 from the rider's feet such that at least one rider detection switch 523 is activated when a rider is standing on the mat. The presence of a rider may be detected by observing the values of the switches 523 and the switches may be used to change between control regimes for the machine. For example, if 2 or more switches 523 are closed, then the machine may be commanded to change from follow mode to balance mode. Similarly, if fewer than 2 switches 523 are closed while in balance mode, the speed limit may be set to zero. If no switches are closed in balance mode, the machine may be commanded to switch back to follow mode.

It is important to note that this rider detection system has multiple states (0-4 switches closed). For this reason it is preferred over a simple two state (0-1) system. It is to be understood that any system that detects the presence of a rider using multiple state transitions is included in the current disclosure (e.g. a force sensing plate that provides a range of analog voltages based on force, a large array of switches distributed on the surface of the machine.

Using this state of the rider detection system to change control modes is preferred both for simplicity (fewer switches to operate) and robustness to operator error (the act of getting on the machine causes it to begin balancing).

Deceleration to Zero

While, as discussed previously, the user may control fore/aft movement of the transporter by leaning, situations may arise where the transporter must be brought safely to a stop due to a system fault or because the user wishes to directly command the safe deceleration of the transporter. Safe deceleration of a transporter is discussed in detail in copending U.S. application Ser. No. 09/687,757, filed Oct. 13, 2000, which is incorporated herein by reference. As described therein, if a component used by the balancing controller fails, the controller may not be able to maintain the moving transporter in a dynamically balanced condition. In a preferred embodiment of the invention, the system is designed to operate for a short period of time in the presence of component failures by the use of redundant components. If a component failure is detected, a deceleration-to-zero routine is executed by the controller to automatically bring the transporter to a stop, thereby allowing the user to dismount from the transporter before the controller loses the capability to maintain dynamic balancing. The deceleration-to-zero allows the device to continue to operate in the presence of component failures and thus continue balancing long enough to execute the deceleration-to-zero maneuver.

The transporter does not require a brake, in the sense of having a device for applying an external opposite torque to the wheel, because the controller and motor amplifier controls the position of the wheel directly. As mentioned previously, the fore-aft motion of the transporter is controlled by the leaning of the user so that if the user wishes to stop, the user merely leans in the direction opposite to the direction of the moving transporter.

The transporter of FIG. 1, in preferred embodiments, employs a speed limiter 70 (shown schematically in FIG. 2) such as to maintain a margin of operation to allow the transporter to balance under all conditions. The speed limiter is described in U.S. Pat. No. 6,302,230. The transporter is decelerated so as to prevent continued operation above the currently set speed limit. Setting the speed limit to zero has the effect of decelerating the transporter, if it is in motion, to a stop. A speed limiting switch 36 (shown in FIG. 1) may be provided so that the user may set the speed limit to zero, thereby causing the transporter to come to a stop.

In preferred embodiments, the deceleration-to-zero is performed by 1) setting the speed limit to zero, 2) providing a visual indicator, 3) generating a software induced vibration from the motor and 4) generating an audio alarm. If the operator does not dismount from the device, other criteria may be used to exit balance mode (such as device speed, time limit, for example).

Audio Alarm

Various conditions, such as an alarm attendant to a requirement that the transporter decelerate to zero velocity, require alerting the user to the existence of such a condition. In order to generate an audible sound, in accordance with embodiments of the present invention, a high-frequency current may be applied through one or both motors of the transporter, thereby creating an audio alarm. This modality is described with reference to FIG. 5. A signal generator 318 supplies a signal within the audio range sensible by a person, typically based on amplitude and phase data provided by balancing controller 310 or another system level controller. The signal from generator 318 is used to modulate the current command to amplifier controller 322 and thus to govern the voltage applied to one or more of the transporter motors, thereby generating a sound without requiring an opening in the body of the transporter.

Figure 5:
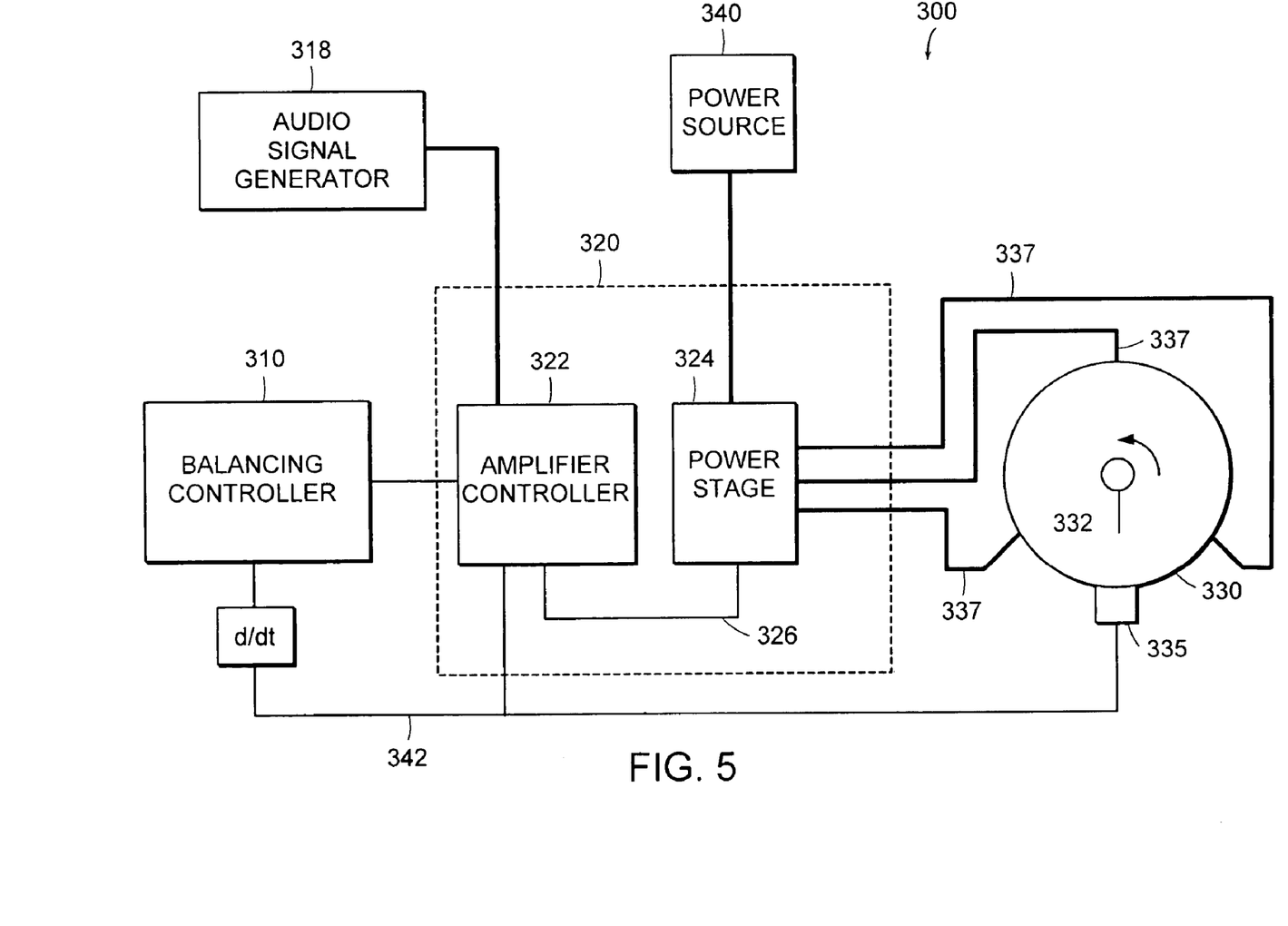
FIG. 5 is a block diagram of an audio alarm coupled to a power drive module in accordance with an embodiment of the present invention.

FIG. 5, generally, shows a block schematic of a power module 300 of one embodiment of the present invention. A balancing processor 310 generates a command signal to motor amplifier 320 that, in turn, applies the appropriate power to motor 330. Balancing processor 310 receives inputs from the user and system sensors and applies a control law, as discussed in detail below, to maintain balance and to govern motion of the transporter in accordance with user commands. Motor 330, in turn, rotates a shaft 332 that supplies a torque, $\tau$, at an angular velocity, $\omega$, to a wheel 20, 21 (shown in FIG. 1) that is attached to shaft 332. In some embodiments, a transmission, not shown, may be used to scale the wheel speed in relation to the angular velocity of the shaft 332. In a preferred embodiment of the present invention, motor 330 is a three-coil brushless DC motor. In that embodiment, motor 330 has three sets of stator coils although any number of coils may be used. The stator coils are electrically connected to a power stage 324 by coil leads 337 capable of conducting large currents or high voltages. It is understood that the large currents and high voltages are relative to the currents and voltages normally used in signal processing and cover the range above 1 ampere or 12 volts, respectively.

Motor amplifier 320 itself contains both an amplifier processor 322 and a power amplification stage 324. Amplifier controller 322 may be configured to control either current or voltage applied to the motor 330. These control modes may be referred to as current control mode and voltage control mode, respectively. Voltage control mode is a preferred mode of operation. Power stage 324 switches the power source 340 into or out of connection with each coil, with the switching of the power stage 324 controlled by the amplifier controller 322. An inner loop 326 senses whether the output of power stage 324 is as commanded and feeds back an error signal to amplifier controller 322 at a closed loop bandwidth, preferably on the order of 5 kHz. The audio alarm signal is preferably at half the closed loop update rate and appears as a ripple superposed on the amplifier control input. Additionally, control by amplifier controller 322 is based, in part, on a feedback signal from shaft feedback sensor (SFS) 335.

Shaft feedback sensor 335 is also in signal communication with the processor 310 and provides information related to the shaft position or motion to the processor. The shaft feedback sensor 335 may be any sensor known in the sensor art capable of sensing the angular position or velocity of a rotating shaft and includes tachometers, encoders, and resolvers. In a preferred embodiment, a Hall sensor is used to sense the position of the rotating shaft 332. The outer feedback loop 342 operates at a bandwidth characteristic of the balance control provided by balance processor 310 and may be as low as 20-30 Hz.

Delivery of an audio alarm to the attention of a user in the manner described herein is particularly advantageous in conveying a strong and urgent message such as an imminent requirement to alight from the transporter. A pedestrian alert and other messaging functions may also be provided in this manner.

Personal Controller Key

As described in the foregoing discussion, dynamically-stabilized personal transporters utilize electronic control for balancing and other operations. This "fly-by-wire" nature lends itself to tailoring the control system of a transporter to the personal characteristics of an individual user. Personal characteristics of a transport user affect the operation of a dynamically-stabilized transporter in many ways. In one instance, characteristics such as physical dimensions of the user may affect the stability of the transporter. Therefore, specific settings of the balance controller and yaw controller may be set to optimize the control of the transporter. In another instance, the control system may be programmed to accommodate designated user preferences to improve the comfort and pleasure of the user. In a third instance, operating limits of specific parameters of the transporter may be commanded by the control system to accommodate personal characteristics of a user, optimize the parameters for the specific operational environment, or allow a user to select different parameter limits in accordance with the training or experience of the user. By way of example only, actions of the control system to operate the transporter well within the safe range of selected operating parameters such as acceleration, transporter yaw rate, and maximum speed. In another instance, settings of the control system may be affected by whether the operator is riding the transporter or guiding the transporter without riding it. The aforementioned instances illustrate how personal characteristics may affect the control of a dynamically-stabilized transporter without exhausting the possibilities.

The control system of the transporter typically utilizes specific values of control parameters that operate the control system of the transporter in accord with personal characteristics of the user. Changing users may require changing the values of the control parameters.

Thus a controller data device may advantageously allow personal characteristics of a user to be stored. Personal characteristics may also be stored in the form of a tailored set of control parameters and operating limits of the transporter. The controller data device may be programmed at the discretion of the individual user or pre-programmed by the transporter manufacturer or distributor. Alternatively, the controller data device may be designed such that the transporter manufacturer or distributor may restrict other entities, including individual users, from programming particular parameters over certain values or not allowing any programming of particular parameters.

Figure 6:
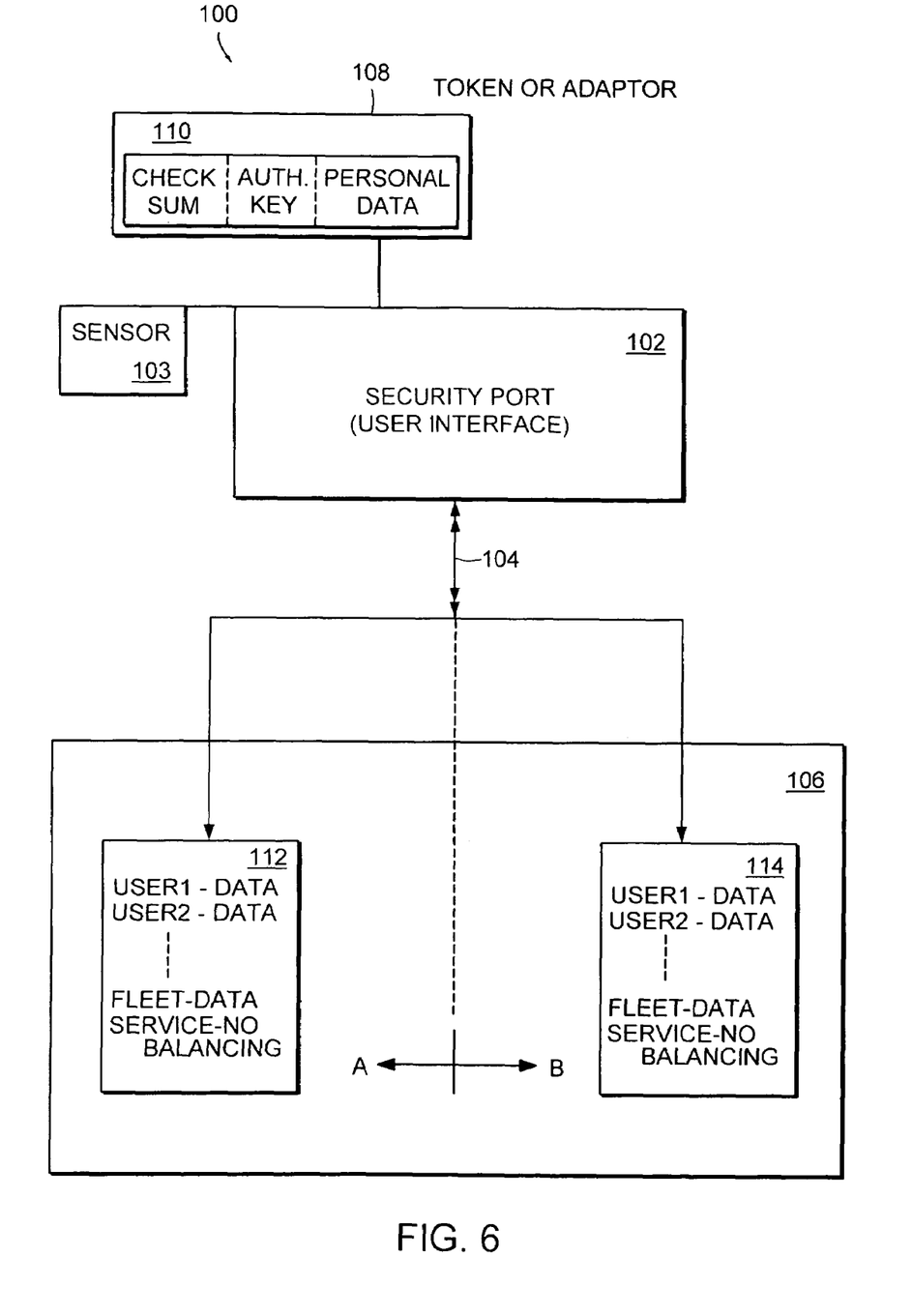
FIG. 6 is a block diagram further depicting a security system in accordance with preferred embodiments of the present invention.

Referring now to FIG. 6, a block diagram is provided depicting a security system 100 in accordance with preferred embodiments of the present invention. A data port 102 is provided, preferably disposed on stalk 16 as depicted in FIG. 1. Data port 102 provides access to a data line 104 providing for the flow of data between an external device and both processors A and B of a redundant transporter control system 106. Various devices may be coupled to data port 102 in order to exchange data with control system 106.

One class of such peripheral devices includes a token 108 which may also be referred to as a 'smart key.' Token 108, comprises a data memory 110 in which are stored an Authentication Key uniquely identifying a user, along with Personal Data associated with the uniquely identified user that may, in turn, be employed by the transporter control system 106 to govern specified operating parameters.

Each processor A and B contains a separate sealed memory, 112 and 114, respectively, in which parameters characterizing potential users of the transporter may be stored. The contents of memories 112 and 114 may not be accessed from outside the transporter, thus preserving the security of the device.

Data may be associated with individual users, and, additionally, with the management of a fleet of transporters, and, further, with operators, such as service personnel, who are not to be empowered to operate the transporter in a balancing mode, are stored in memories 112 and 114. After data provided by token 108 are screened for data integrity, employing a checksum embodied in the token data memory, if present, the authentication key and personal data embodied in token 108 are used to select the appropriate operating parameters for the transporter from the data stored in memories 112 and 114. The contents of the redundant memories may be cross-checked for integrity.

It is notable, in accordance with preferred embodiments of the present invention, that data may also flow from the transporter controller 106 to the token. Thus, for example, a record may be kept, within memory 110 of the token itself, as to particular features of the operating history of the transporter with an identified user in control of the transporter. The record may includes such features as the number of hours of operation performed by a particular user, the speeds and operating features employed by the user, hours of the day during which operation occurred, user behavior (characterizing smoothness of operation), etc. Moreover, cumulative data may be maintained, either on board the device, or as downloaded onto a token or other memory.

The use record thus derived from operation of the transporter may be advantageously employed, for example, to provide a basis for built-in qualification, training of a user; the user record allows determination as to whether a particular user has sufficient experience to be qualified to operate more substantial functionalities of the transporter and user access to various functionalities may be limited until the user is qualified.

Token 108 may take the form, for example, of a programmable I-Button™, available from Dallas Semiconductor. Token 108 may be programmed remotely, and may required to be enabled remotely, as by a code provided electronically by telephone or via the Web.

A programming device, used to program the token device, may take a number of different forms, with the token including an appropriate interface to accommodate the form of the controller data device.

Two examples of programming devices are a personal computer or a personal data assistant, though many other forms can be used. The token data device and programming device may be linked during programming using either a physical connection or utilizing a wireless link.

A personal characteristic that a controller data device may store is the identity of the user. Thus a controller data device may have an additional benefit of disallowing unauthorized use of a particular transporter. The identity of a user may also serve to restrict usage or operating ranges of a transporter to a category of users.

In an example, inexperienced users are defined as transport users who are unfamiliar or uncomfortable with the operation of a dynamically-stabilized transporter, while experienced users are, familiar and comfortable with the transporter operation. Thus two (or more) operating modes, tailored to experienced or inexperience users of the transporter, may exist, with users identified as inexperienced being unable to use the experienced user operator mode. Other operating modes or restrictions on dynamic operation can be developed based upon the identity of a user.

Controller operation of the transporter can also be limited because of environmental conditions. Environmental conditions, as detected by a variety of types of environmental sensors, may be combined with personal characteristics of a user to determine particular dynamic operating ranges that a control system selects for transporter operation.

Data Port and Strap-On Interfaces

In alternate embodiments of the invention, data port 102 permits data line 104 to be coupled, via an adapter, to another peripheral device for ascertaining the identity of an authorized user. For example, a reader sensitive to the presence of a passive or active token, such as a 'smart card', that may be read remotely, may be coupled to data line 104 via data port 102. Alternatively, a sensor 103 for recognizing biometric indicia of a particular user, such as fingerprints, facial or retinal features, etc., may be coupled to the data line. In a further alternate embodiment, a keypad or voice recognition device may similarly be coupled to the data line at data port 102.

Moreover, data port 102 may advantageously serve to power on the transporter in the presence of an authorizing data signal, either from a token or an alternate peripheral authorization device.

Data port 102 may also be used to continuously report information from the unit to a receiving device by strapping a transmission device to the data port. Such data might include but are not limited to speed, user authentication code and remaining range. Such a data port may also report information to be combined with locating device such as a GPS system Such a data port may be bi-directional so that a centralized location may be able to set device control parameters real-time by transmitting through a wireless link. For example, the speed limit could be reduced if the device reports a location (such as a theme park or shopping mall) where a reduced speed limit is desired.

Token Supplements

In accordance with other embodiments of the present invention, the requirement of a token, such as a programmable I-Button™, may be supplemented by a requirement of authorization input that may be provided uniquely by a specified user. Thus, for example, a specified orientation for application of a token to the data port may be required, where the specified orientation is known only to a user. Similarly, a user may be required to apply a predetermined sequence of inputs to the transporter (such as may be sensed by the yaw input or the rider detection system, for example) or other sensing modalities such as monitoring the orientation of the transporter in order to activate the transporter.

The user may be required to provide a code, known only to the user, in order to achieve a specified mode of operation, moreover, the code may be changed, either by the user or remotely, to provide desired security features and functionality. In particular, the code may be updated on a periodic or random basis.

Theft Detection and Stick Shake Mode

In accordance with yet further embodiments of the present invention, the transporter operates in a low-power mode when not in use for balanced operation by an authorized user. In the low-power mode, one or more sensors, such as those used by the transporter for balancing, may be employed to detect unauthorized movement of the transporter. Upon detection of unauthorized contact, the device may be disabled by locking wheels, shaking ('stick shake mode'), an uncontrolled tantrum mode, or by sounding a siren, or otherwise alerting police or other authorities, all such modes of transporter disablement referred to collectively as an 'interrupt.'

Frame Fault Interrupt

For user safety, it is desirable that no electrically conductive contact point be allowed to be at a harmful potential with respect to the frame of the transporter, taken to include those component parts, such as platform 12 and handle 16 with which a user is typically in contact. In accordance with an embodiment of the invention, one side of the data port user interface 102 is battery negative. It is thus desirable to provide a relay for decoupling the data port from battery potential in case a frame fault is detected. Accordingly, the frame is monitored to ensure that no electrical coupling occurs to a circuit potential. Moreover, a frame fault might be indicative of a common-mode failure between otherwise independent and redundant subsystems A and B, as described in U.S. Pat. No. 6,288,505. One method for monitoring the frame includes applying a periodic potential to the frame, with respect to battery negative, via a large resistor so that no appreciable current can be drawn. In case the expected potential is not detected on the frame, the device is decelerated to zero and shut off.

Range Limiting

In an alternate embodiment, operation of the transporter may be enabled, modified, or limited, on the basis of a locator such as a Global Positioning System. To illustrate one particular instance of the use of this embodiment, a controller may combine a personal characteristic, for example the identity of a user, with the location of the transporter, for example proceeding down a steep hill, to restrict the maximum operating speed of the transporter. Of course, there are many other ways to implement such an embodiment. For example, under certain circumstances, it may be advantageous to set the maximum speed to zero, thereby disallowing motion. The transporter may be caused to steer back to a specified location following a specified GPS track, or, the machine may be shut down entirely, as in response to detected theft.

Helmet Interrupt

In accordance with yet further embodiments of the present invention, particular operating modes of a transporter may be enabled or precluded from operation depending upon whether a condition relating to the presence of safety gear is satisfied. The presence of a helmet or other required article may be sensed remotely.

In accordance with various embodiments of the invention, certain modes and control parameters of the transporter can only be used if the user is wearing appropriate safety gear. In one embodiment of this invention, a specially programmed personal controller key is embedded in or otherwise attached to appropriate safety gear, such as a user helmet. In this embodiment, the user could operate the transporter only in certain modes, such as non-dynamically balanced mode, or with certain control parameter limits, using a standard user controller key. To access other modes, such dynamically stabilized operation modes, and higher control parameter limits, the user must be using the user control key that is embedded or otherwise attached to the appropriate safety gear. Thus, the user must have the appropriate safety gear at his or her side to operate the transporter in these selected modes or at these selected parameter limits, thus increasing the probability that the user will wear such appropriate safety gear.

Ambient Light Sensor

In another embodiment, the environmental sensor described above may be an ambient light sensor, preferably coupled to a user interface. The ambient light sensor detects ambient light levels. The machine then modifies behavior, specifically reducing speed limit, as one example, when the light level drops below a specified and predetermined level, thus requiring, for example, slower travel at night.

In accordance with further embodiments of the invention, an accessory light may be provided which may be plugged into the User Interface, thus communicating with the system and restoring full functionality and speed if and only if a "certified" light is plugged in.

Finally, the light sensor may also serve a "brake" control function in that, if covered by the user such as with a thumb, the speed limit is reduced, in accordance with the above teachings.

For the purpose of illustrating the invention, various exemplary embodiments have been described with reference to the appended drawings, it being understood, however, that this invention is not limited to the precise arrangements shown. Indeed, numerous variations and modifications will be apparent to those skilled in the art. All such variations and modifications are intended to be within the scope of the present invention.

What is claimed is:

1. An audio alarm for a transporter of the type having an electric motor for driving the transporter by supplying a torque to a drive arrangement, the alarm comprising:
   a. a signal generator for generating a signal within the frequency range of hearing of a person; and
   b. a modulator for modulating a current applied to the electric motor in accordance with the signal generated by the signal generator to produce an audible alarm.

2. A method for alerting a user of a transporter of the type having an electric motor for driving the transporter by supplying a torque to a drive arrangement to the occurrence of a specified condition, the method comprising:
   a. generating a signal within the frequency range of hearing of a person; and
   b. modulating a current applied to the electric motor in accordance with the signal generated by the signal generator to produce an audible alarm.

3. A method in accordance with claim 2, wherein the specified condition includes a requirement that the transporter decelerate to zero velocity.

4. A method in accordance with claim 2, wherein the step of modulating a current includes modulating current applied to a plurality of electric motors.

* * * * *

UNITED STATES PATENT AND TRADEMARK OFFICE
CERTIFICATE OF CORRECTION

PATENT NO. : 7,592,900 B2  Page 1 of 1
APPLICATION NO. : 11/552829
DATED : September 22, 2009
INVENTOR(S) : Dean Kamen et al.

It is certified that error appears in the above-identified patent and that said Letters Patent is hereby corrected as shown below:

Column 3, line 35, please delete "Error! Objects cannot be created from editing field codes.," and please insert -- $T = K_1(\theta - \theta_0) + K_2(\dot{\theta} - \dot{\theta}_0) + K_3(X - X_0) + K_4(\dot{X} - \dot{X}_0).$ --

Signed and Sealed this

Nineteenth Day of January, 2010

David J. Kappos
*Director of the United States Patent and Trademark Office*